United States Patent [19]

Adell

[11] Patent Number: 4,581,807
[45] Date of Patent: Apr. 15, 1986

[54] CO-EXTRUDED INSULATED EDGE GUARD

[75] Inventor: Robert Adell, Sunnyvale, Tex.

[73] Assignee: U.S. Product Development Company, Sunnyvale, Tex.

[21] Appl. No.: 533,686

[22] Filed: Sep. 19, 1983

[51] Int. Cl.⁴ ............................................. B23P 17/04
[52] U.S. Cl. .................................... 29/527.4; 49/462; 264/171
[58] Field of Search ................. 29/527.4, 527.2, 527.1; 49/462; 264/171

[56] References Cited

U.S. PATENT DOCUMENTS

| | | | |
|---|---|---|---|
| 3,167,856 | 2/1965 | Zoller | 29/527.1 X |
| 3,399,448 | 9/1968 | Jackson | 29/527.1 X |
| 3,470,598 | 10/1969 | Berthelsen | 29/527.1 X |
| 4,094,056 | 6/1978 | Takeda et al. | 29/527.2 |

Primary Examiner—Howard N. Goldberg
Assistant Examiner—Vernon K. Rising
Attorney, Agent, or Firm—Stephenson & Boller

[57] ABSTRACT

The disclosure is of a co-extruded insulated edge guard in which insulating material is co-extruded onto metal. Various embodiments of edge guards are disclosed. The co-extruded insulating material interlocks with the metal of the edge guard.

11 Claims, 30 Drawing Figures

CO-EXTRUDED INSULATED EDGE GUARD

BACKGROUND AND SUMMARY OF THE INVENTION

This invention relates to ornamental and protective edge guards such as are applied to the edges of sheet metal members of automotive vehicles, for example, swinging closures such as doors, trunk lids, hoods, gasoline fill doors, and other members such as drip rails, bumper edges, etc. The invention relates to both the edge guards themselves and methods of making same.

In an automotive vehicle it is desirable to apply edge guards to the edges of swinging closures so as to protect said edges from damage which might be caused by striking an object present in the path of movement of the edge of the swinging closure. Edge guards also provide ornamental and decorative function in addition to their door edge protective function, and hence, they may also be applied to the edges of sheet metal members other than swinging closures. Moreover, edge guards not only provide protection of the edges of the members on which they are installed but also they may serve the purpose of providing protection to individuals when applied over raw edges.

In general it is undesirable to use separate fasteners, adhesives, or similar procedures in securing edge guards on automobile edges since they involve extra cost of labor and materials. It is also generally undesirable to use strictly non-metallic edge guards such as extruded vinyl edge guards since they do not possess the excellent protective, ornamental, and self-retention characteristics of metallic edge guards.

However, application of a metallic self-retaining edge guard to a door edge has the potential for giving rise to paint scratching and marring which can in turn lead to premature corrosion. Some of applicant's own inventions have addressed the matter of possible paint scratching and marring and have provided solutions. Reference is made to the following patents of applicant:

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 |

Applicant also has pending applications directed to the same general subject.

As disclosed in certain of applicant's prior patents and pending applications, insulating material can be applied to the edge guards to guard against paint scratching and marring; yet the edge guards can still possess the desirable self-retention characteristics of metallic edge guards requiring no external fasteners and/or adhesive. Disclosed in certain of applicant's patents and pending applications are procedures for laminating insulating film to metal to form a laminated structure. The laminated structure is formed into the door edge guard such that the insulating material provides an insulating and sealing barrier between the interior of the edge guard and the edge of the object to which it is applied.

The present invention is directed to further improvements in insulated edge guards of the type comprising a metal edge guard channel to which protective insulation is applied. The invention relates both to the edge guard itself and the method of its manufacture. Although the present disclosure is of specific presently preferred embodiments, principles of the invention may be extended to other embodiments.

The edge guard of the present invention possesses the superior ornamental, protective and self-retention characteristics of applicant's prior insulated edge guards. It also offers the possibility for a variety of adaptations employing basic principles of the invention.

In one respect the invention contemplates an insulated metal edge guard in which the cross section of the metal channel forming the edge guard may be of general U-shape with the construction having a unique arrangement for cooperatively relating the liner and the metal channel. In another respect the present invention contemplates the application of the protective insulation to the metal edge guard through a co-extrusion process. The co-extrusion process may be conducted with single or multiple extruders of any suitable type, a cross head extruder being one such type. Precise control of dimensions of the finished edge guard may be achieved through the use of subsequent cooling and sizing procedures.

It is also possible for the co-extrusion process to be selectively applied in any of a number of possible ways to any of a number of possible metallic channel cross sectional shapes. For example, it is possible to line only the interior or selected portions thereof, only the exterior or selected portions thereof, or both the interior and exterior and/or selective portions thereof in combination.

The invention is particularly disclosed in connection with the application to door edge guards which are applied to the trailing edges of a vehicle's doors.

It is also possible for different types of insulating materials to be used and it is possible to supply selectively different types of insulating materials to an edge guard so that multiple composite layers may result.

The foregoing features, advantages and benefits of the invention, along with additional ones, will be seen in the following description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
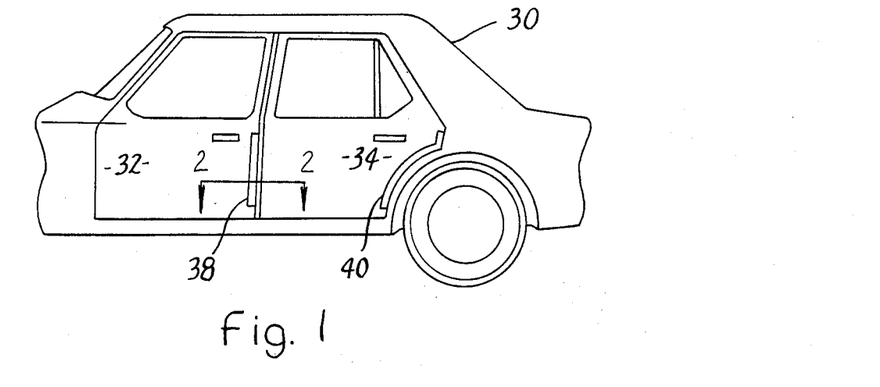
FIG. 1 is a partial side elevational view of an automobile equipped with door edge guards embodying principles of the present invention.

FIG. 1 shows a portion of an automobile 30 comprising front and rear doors 32 and 34 on the trailing edges of which are door edge guards 38 and 40 respectively embodying principles of the present invention. The illustrated edge guards are elongate and essentially co-extensive in length with the trailing edges of the doors. Each edge guard conforms to the contour of the trailing edge of its door. It will be appreciated however that the actual length of an edge guard may be less than the length of the trailing edge, and therefore it will be appreciated that the drawing is merely representative.

Figure 2:
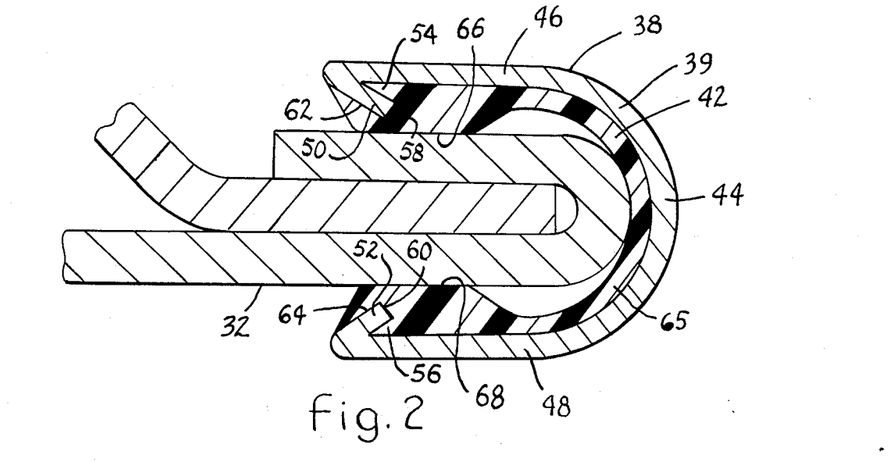
FIG. 2 is a cross sectional view on an enlarged scale taken in the direction of arrows 2—2 in FIG. 1.

FIG. 2 illustrates the transverse cross sectional shape of door edge guard 38. Edge guard 38 represents the engineering design shape and it will be appreciated that in actual specimens the cross section may depart from the engineering design shape due to forming, cutting or other procedures which result in slight metal distortion. The edge guard comprises a metal channel 39 and an insulating liner 42. The insulating liner 42 is applied to the metal channel through a co-extrusion process to be hereinafter described in greater detail. The illustrated cross section of the metal channel 39 may be considered as being of a symmetrical U-shape. It comprises a generally semi-circular base portion 44 from opposite ends of which extend legs 46 and 48 respectively. In the illustrated embodiment, the legs 46 and 48 are shown in cross section to be parallel when the edge guard is installed on the door edge. The legs 46 and 48 are of equal length and the distal end of each leg 46, 48 contains a respective inwardly directed flange, or barb, 50, 52 respectively. In the illustrated construction the barbs 50, 52 are shown to be of identical length and angularity with respect to their respective legs 46, 48.

The insulating liner 42 is any suitable insulating material such as vinyl plastic. Other formulations than vinyl however, may be employed and these may include multiple layer laminants and/or different materials. Liner 42 lines the full interior of the U-shaped cross section including the barbs 50 and 52. It will be observed that insulating material extends fully into the crevices 54, 56 on the inside of the U-shaped channel between each barb 50, 52 and its respective leg 46, 48. Moreover, insulating material covers the end edges 58, 60 and the side edges 62, 64 of the barbs 50, 52. Indeed, the insulating material extends across the side edges of the barbs fully to the outside surface of each leg 46, 48.

Furthermore, the insulating liner is of enlarged thickness in the immediate vicinity of where it covers each barb 50, 52 and this enlarged thickness extends partially into the U-shaped channel part way along each leg where it is blended into a reduced thickness portion 65 which extends downwardly to cover the semi-circular base portion 44.

Figure 3:
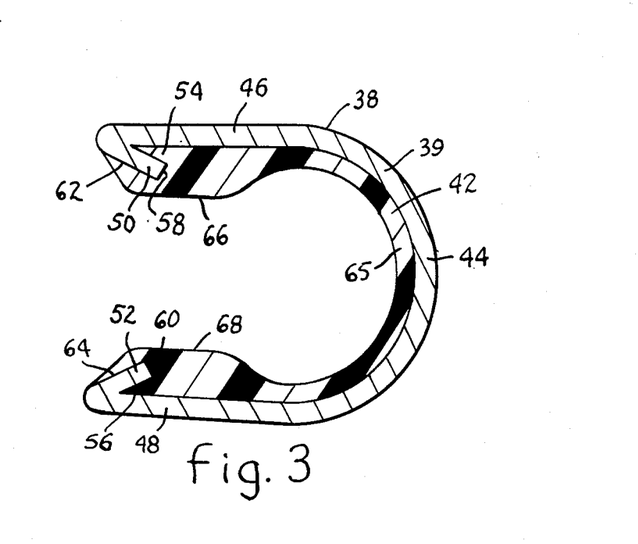
FIG. 3 is a view similar to FIG. 2 illustrating the door edge guard of FIG. 2 in a free condition by itself.

The enlarged portions are provided with flat confronting surfaces 66, 68 which are illustrated to bear against the opposite sides of the door edge. These are the points at which the retention force is exerted on the door by the resilient expansion of the metal channel which occurs when the edge guard is applied to the door. Referring for a brief moment to FIG. 3 one can see that the illustrated cross section of the edge guard by itself apart from the door is slightly collapsed from the U-shape shown in FIG. 1 whereby it can be appreciated that upon being applied to the door edge, the edge guard resiliently slightly expands with the resilient force being provided by the metal channel 39.

It will be observed that when installed on the door edge the metal of the edge guard is completely insulated from the door by virtue of the full insulating liner. This provides insulation against electro-chemical action between any dissimilar metals and it also can provide a protective shock absorbing feature. Yet it provides excellent self-retention and installation characteristics.

The arrangement of the barbs 50 and 52 is such that they facilitate the application of the edge guard to the door edge but preclude scuffing or marring during the installation process. The outer side edges 62 and 64 constitute leading edges which may exhibit a camming type of interaction with the door edge during the installation process. However, because they are covered by protective insulation, marring and scratching are essentialy precluded. Camming interaction can facilitate the resilient expansion of the metal channel 39 as the door edge is increasingly fitted onto the edge of the door. When the edge guard has been fully expanded the enlarged protuberances of insulation come into contact with the sides of the door edge so that the retention pressure is concentrated at the surfaces 66 and 68 bearing against opposite sides of the door edge. Yet the edge guard can be installed to fit fully onto the edge of the door so that the end of the door edge abuts the insulation at the base of the semi-circular U-shaped portion 44. Thus at all times during the installation process the insulation provides protection between the metal channel of the edge guard and the edge of the guard and it will continue to do so over the period it remains installed. The retention force is very satisfactory because of the concentrated pressure applied at surfaces 66, 68 to the opposite sides of the door edge.

In the typical door edge guard, the door edge thickness is relatively small and hence the dimensions of the edge guard are likewise relatively small. The illustrated construction of the edge guard serves to provide an interlock of the insulation with each barb 50 and 52. The interlockihg of the insulating material within the crevices 54 and 56 assists in securing the insulating material in place.

Figure 4:
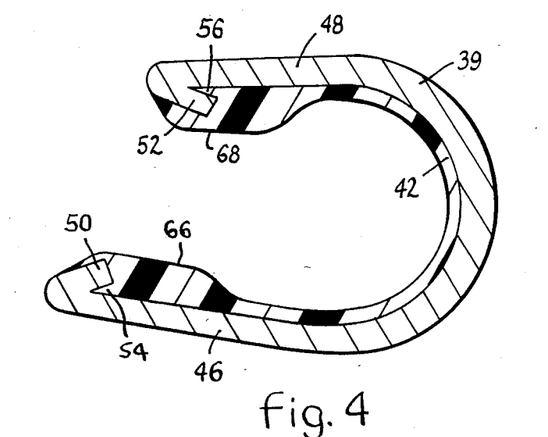
FIG. 4 is a cross sectional view illustrating a second embodiment of edge guard.

FIG. 4 illustrates a further embodiment of edge guard cross section. This embodiment is similar to the embodiment of FIG. 2, with like reference numerals designating like parts, except that one of the legs 46, 48 is made longer than the other. The embodiment of FIG. 4 may be desirable for use in certain applications.

Figure 5:
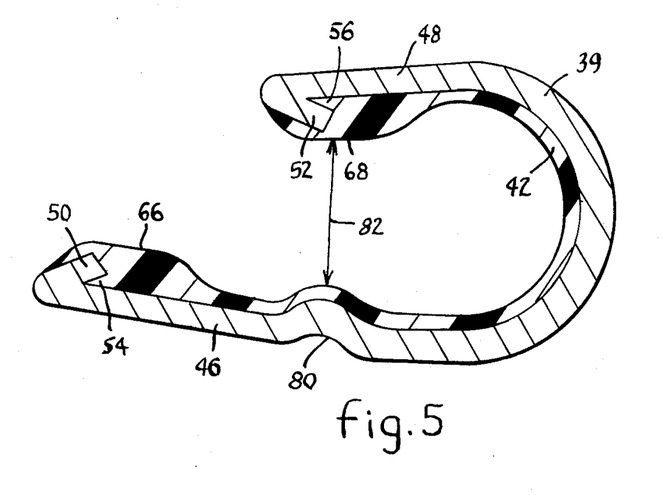
FIG. 5 is a cross sectional view illustrating a third embodiment of edge guard.

FIG. 5 illustrates a third embodiment which is similar to the embodiment of FIG. 4 but has an indentation 80 directly opposite barb 52 of the shorter leg 48, and it is across the opening indicated by arrow 82 that the principal retention force is created when the edge guard is installed on the door edge. The interlocking of the insulation still takes place on the longer leg at its inwardly directed barb.

Figure 6:
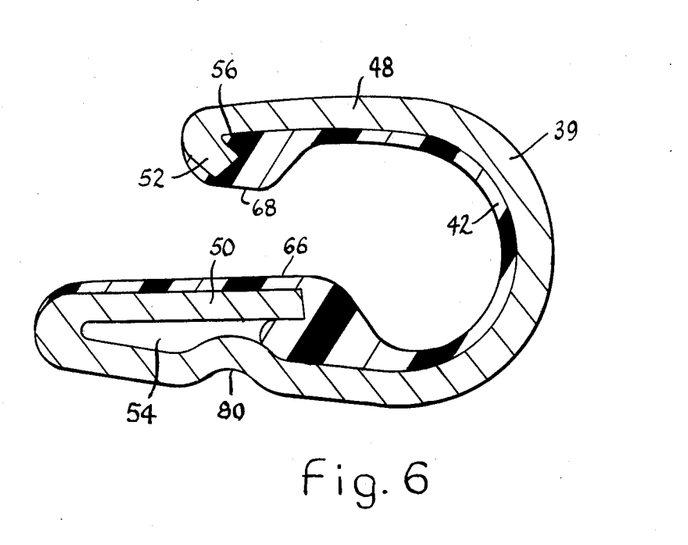
FIG. 6 is a cross sectional view illustrating a fourth embodiment of edge guard.

FIG. 6 illustrates a fourth embodiment of cross section which is somewhat different than the other embodiments. The shorter leg of this embodiment is similar to that of the other embodiments. However, the opposite longer leg 46 is considerably different. This longer leg is constructed such that the barb 50 extends from the distal end of its leg back within the interior of the channel a much greater extent than in the other embodiments. Insulation also extends only partially into the corresponding crevice created between the barb and its leg.

FIG. 6 illustrates the free position with the edge guard uninstalled. In this condition the barb is spaced outwardly from the indentation 80 formed in the same leg. The barb is arranged to act to a certain extent like a cantilever about the distal end of its leg. The cantilever action occurs as the edge guard is being installed on an edge. The semi-circular base will flex to exert the resilient retention force, and concurrently and in conjunction therewith, the barb will deflect toward indentation 80. This particular construction may be advantageous for certain applications.

Figure 7:
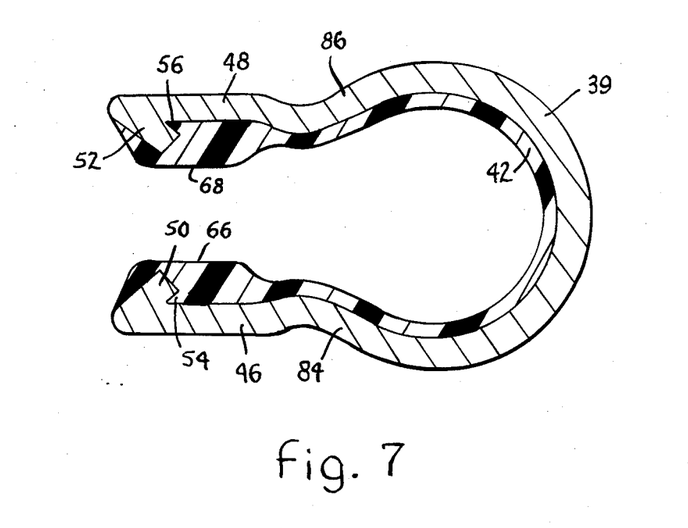
FIG. 7 is a cross sectional view illustrating a fifth embodiment of edge guard.

FIG. 7 illustrates a fifth cross section in which the distal ends of the legs are set inwardly from the semi-circular base and connected to the semi-circular base by means of curve bend sections 84, 86. This general concept of insetting the distal ends of the legs is also found in applicant's U.S. Pat. Nos. 4,379,376 and 4,379,377. This can serve to create a still greater pressure acting upon opposite sides of the door edge for retention purposes.

Figure 8:
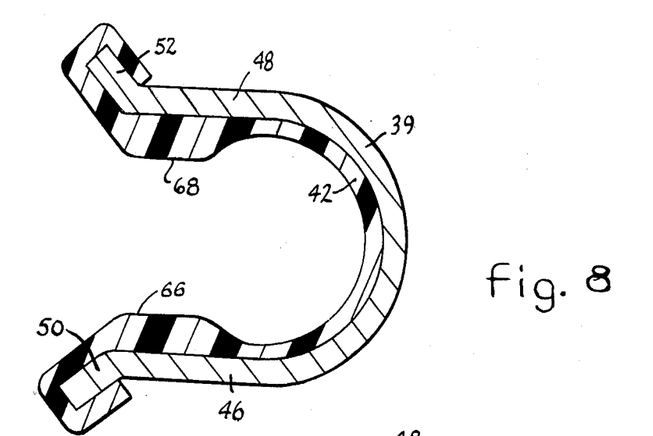
FIG. 8 is a cross sectional view illustrating a sixth embodiment of edge guard.

FIG. 8 illustrates still another embodiment of cross section. This cross section differs from previous ones in that the ends of the legs have the barbs turned outwardly in the manner illustrated. The barbs can still cause camming interaction with the door edge during installation of the edge guard, with the metal channel resiliently flexing in the same manner described above. This embodiment illustrates the interior liner extending not only over the full interior surface of the channel but also around the outside surfaces of the outwardly directed barbs.

Figure 9:
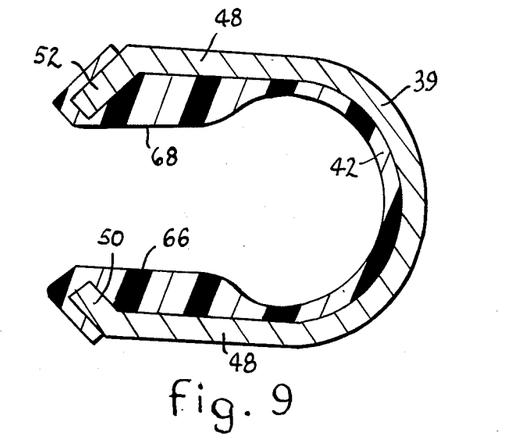
FIG. 9 is a cross sectional view illustrating a seventh embodiment of edge guard.

FIG. 9 illustrates a sixth cross section which is in certain respects similar to the cross section of FIG. 8. In FIG. 9 the barbs are directed slightly inwardly but are not reverse bent as were the barbs in the embodiments preceding FIG. 8.

Figure 10:
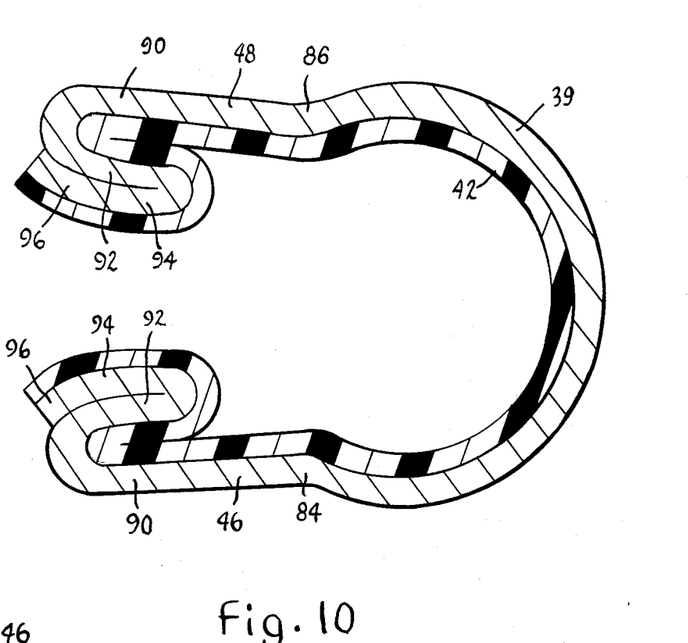
FIG. 10 is a cross sectional view illustrating an eighth embodiment of edge guard.
Figure 11:
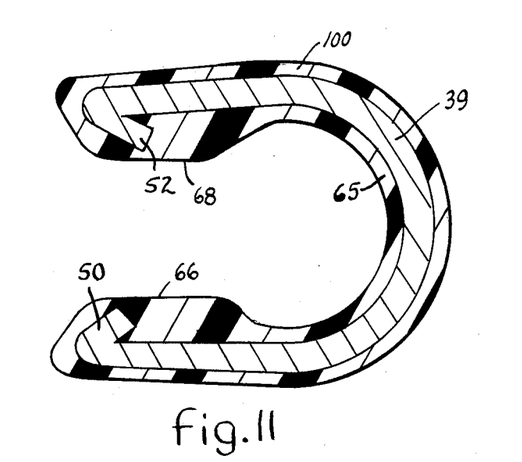
FIGS. 11 through 18 are cross sectional views illustrating respective modified forms of the embodiments of edge guards shown in FIGS. 3 through 10 respectively.

The embodiment of FIG. 10 is similar to the embodiment of FIG. 7 in that the legs comprise the curved bend sections 84, 86 between the distal ends of the legs and the semi-circular base. The embodiment of FIG. 10 differs from the embodiment of FIG. 7 in that it comprises at each bead a triple thickness of metal. This enhances the stiffness of the edge guard insofar as application of pressure to opposite sides of the door edge is concerned when the edge guard is applied on the door edge.

The triple thickness construction comprises for each leg the thicknesses identified by the reference numerals 90, 92 and 94 respectively. A barb 96 is turned outwardly at the end of each section 94. The crevices between the sections 90 and 92 provide interlocking of the insulation. The insulation extends around the full outside surfaces of the sections 94 and 96 as illustrated.

The cross sections of FIGS. 11 through 18 correspond to those of FIGS. 3 through 10 respectively with the sole difference being that in each of the embodiments of FIG. 11 through 18, the entire metal cross section is encapsulated by insulation. In other words in each of the embodiments of FIGS. 11 through 18 a layer 100 of insulation is provided to extend fully around the outside of the general U-shaped cross section.

The method of applying insulation will be explained in detail later in connection with description of the method aspects of the invention. For the moment it may be noted that the embodiments of FIGS. 3 through 10 have an outward installed appearance which is that of the metal of the edge guard channel, such as stainless steel or aluminum for example. Where the insulation does not extend around onto the outside of the U-shaped cross section, the outward appearance of each such installed edge guard is essentially wholly metallic. In other embodiments such as in the embodiment of FIG. 8, a thin band of insulation is presented along the forward outboard edge of the outer leg. This band may be colored to contrast or match with the color of the door and/or the metal of U-shaped channel to provide a decorative aspect in addition to the functional protective and insulative attributes. Full color compatibility may be obtained in the embodiments of FIGS. 11 through 18 by making the outer insulation layer a color matching that of the door. Alternatively it is possible to have a contrasting color. Moreover, it is possible for the insulation to be selectively applied to the edge guard to provide other forms of outward appearance characteristics.

Figure 19:
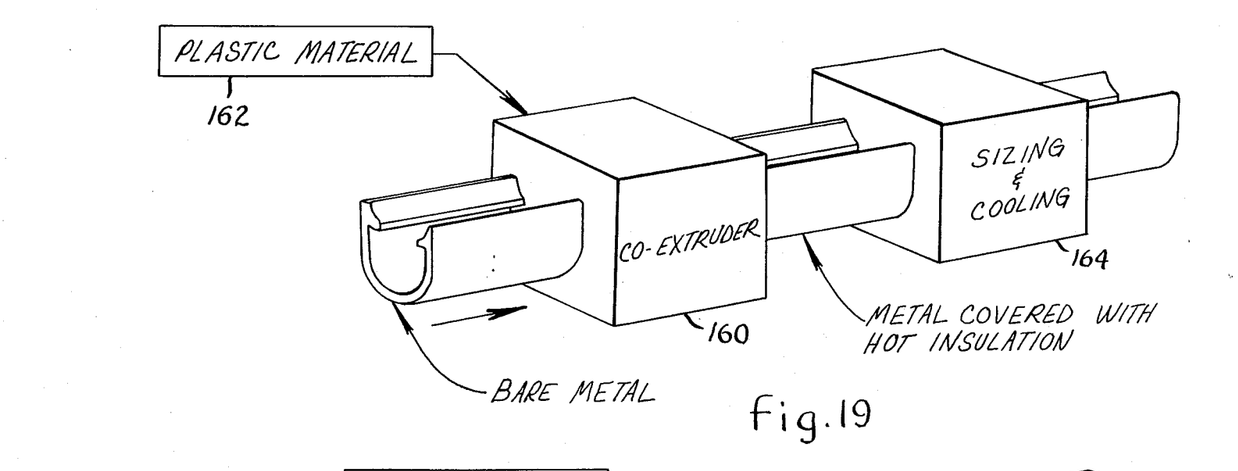
FIG. 19 is a diagrammatic view in perspective illustrating a method of manufacture of edge guards embodying principles of the present invention.

FIG. 19 illustrates a method for making edge guards of the present invention. FIG. 19 shows a metal U-shaped channel passing through co-extruder 160. Co-extruder 160 receives molten plastic material from a source of molten plastic 162. The co-extruder contains a die which is configured to receive the metal channel and cause the molten plastic to flow to line the channel in a desired cross sectional pattern. In other words the co-extruder is effective to deposit plastic material in the form of a film on the metal channel.

The co-extruder die is shaped in accordance with the particular shape of the metal U-shaped channel and the desired shape of the insulation to be applied to the metal channel so as to achieve the desired cross section of the finished product.

As the composite material containing the plastic on the metal channel leaves co-extruder 160, the plastic is still hot. It is subsequently passed through cooling and sizing operations 164 to cool the plastic into a set form and to size the thickness of the plastic at its various points along the cross section.

Figure 20:
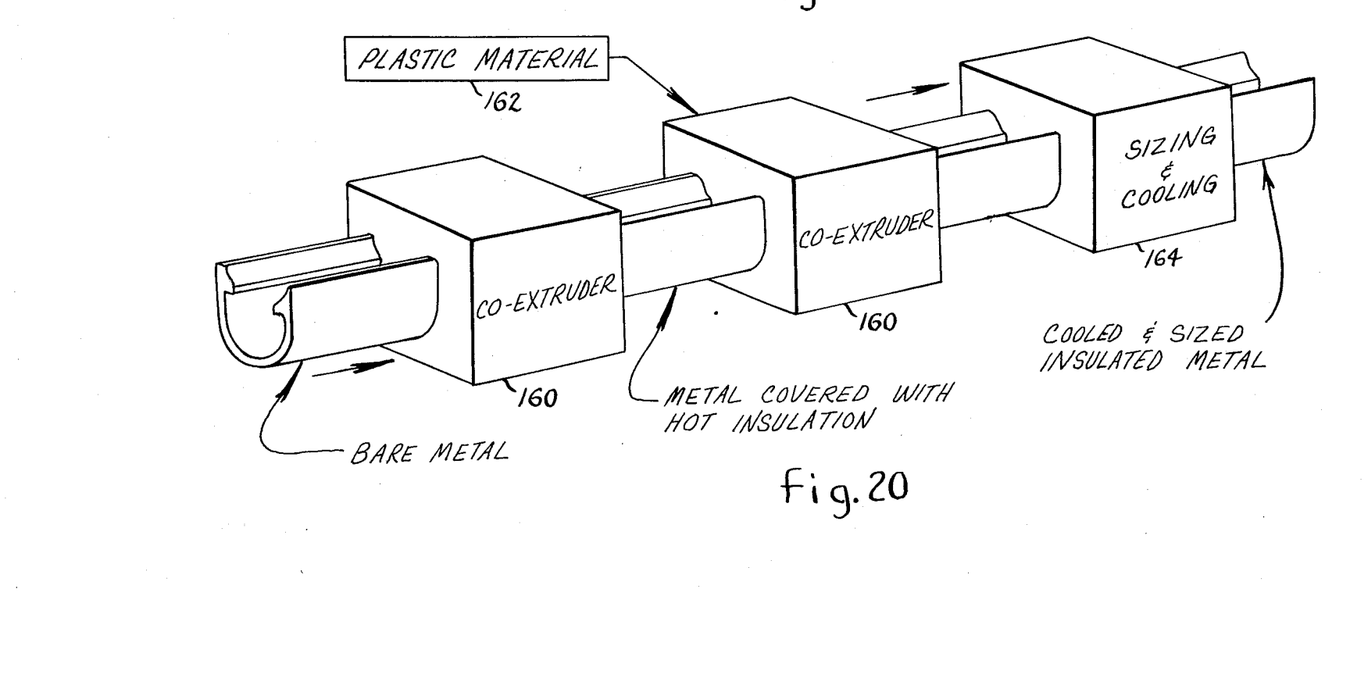
FIG. 20 is a diagrammatic view of another method.

FIG. 20 illustrates the use of plural co-extruders which sequentially apply insulating material to the cross section. It is possible for the first co-extruder to apply insulation to a selected portion of the cross section and the subsequent co-extruder to another selected portion. The respective portions to which the respective co-extruders apply insulation may be fully, partially, or non-overlapping. For example, one co-extruder could apply insulation to the interior of the channel and the other to the exterior. The procedure depicted in FIG. 20 further comprises the cooling and sizing operations to secure the final desired cross sectional shape for the insulated channel.

It will be appreciated that the exact sequence illustrated by FIGS. 19 and 20 may be varied within the generic principles of the invention. For example it is possible to apply the outer layer after the inner layer has been applied, cooled and sized. Alternatively, it is possible to simultaneously co-extrude both inner and outer liners at a single station rather than successively so that the operation conducted at the single station in this manner is in the form of a total encapsulation conducted at one rather than successive applications to inside and outside of the U-shaped cross section.

Figure 21:
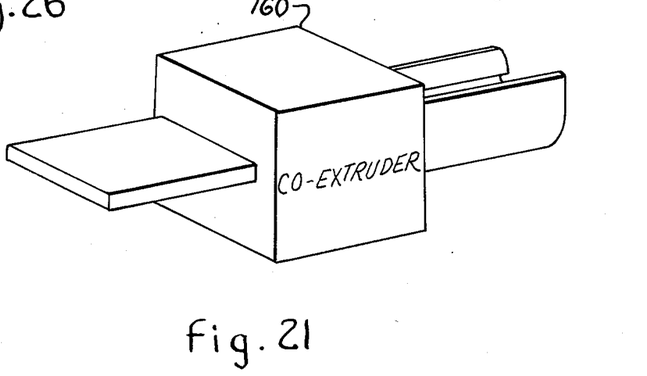
FIG. 21 is a partial diagrammatic view illustrating a step in a further method of manufacturing edge guards embodying principles of the invention.

FIG. 21 illustrates an operation in which the bare metal is introduced in strip form and simultaneously shaped into U-form with the plastic being applied thereto.

Figure 22:
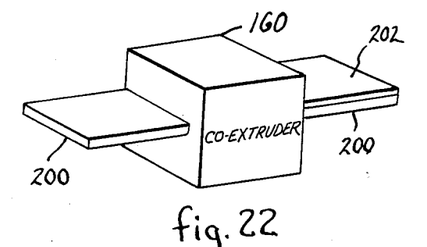
FIG. 22 is a partial diagrammatic view illustrating a modified step.
Figure 23:
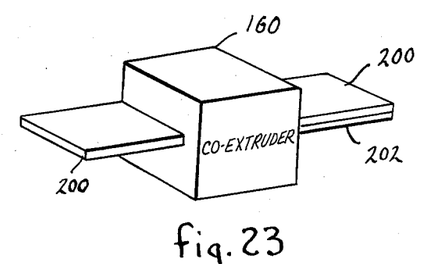
FIG. 23 is a partial diagrammatic view illustrating another modified step.
Figure 24:
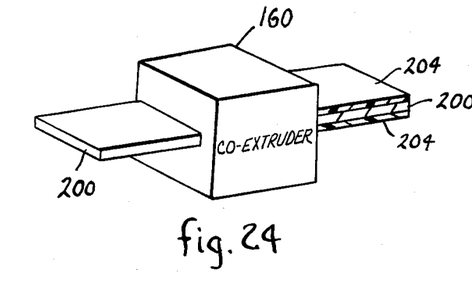
FIG. 24 is a partial diagrammatic view illustrating a still further modified step.

FIGS. 22, 23, and 24 illustrate alternate steps in procedures for manufacturing edge guards embodying principles of the present invention.

FIG. 22 illustrates a flat metal strip 200 entering co-extruder 160 with the co-extruder being effective to apply a film of plastic insulating material 202 to one surface of the flat strip. The insulated strip is then processed by roll forming procedures, so that the edge guard is formed into a desired cross sectional shape with insulation on the interior.

FIG. 23 illustrates a method in which the flat strip 200 is processed with insulation 202 being applied to one surface which upon roll-forming becomes the exterior of the U. It is possible for these insulated U-shaped cross sections of FIGS. 22 and 23 to be further processed through additional procedures including the application of additional insulating material to them. Although FIGS. 22 and 23 illustrate the application of a single layer, it is possible for multiple successive operations to be conducted to deposit multiple layers onto the flat strip.

FIG. 24 illustrates a method in which the co-extruder is effective to provide a total encapsulation 204 of the metal strip which is subsequently formed into the general U-shaped cross section.

The alternatives which are depicted by FIGS. 21, 22, 23 and 24 are contrasted with the procedures of FIGS. 19 and 20. In FIGS. 19 and 20 the insulating material is applied to the U-shaped cross section whereas in the methods of FIGS. 21 through 24, insulation is applied to a flat strip which is subsequently formed into the desired U-shaped cross section.

Figure 25:
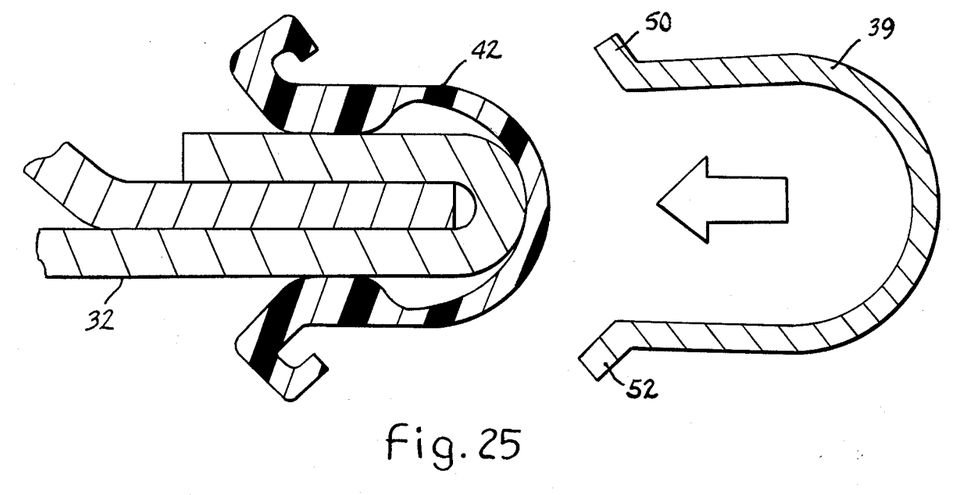
FIG. 25 illustrates an alternate assembly method for one of the edge guards.

FIG. 25 illustrates an embodiment similar to FIG. 8 but showing a particular manner of applying the edge guard to the door. In this instance the liner is a separate plastic extrusion having the same shape as in FIG. 8. The metal channel also has the same shape. However, the liner is first applied to the door by itself. Then the channel is applied onto the edge over the liner with the barbs fitting within the slots at the ends of the liner. The liner may have a slight amount of flexibility to allow the insertion of the barbs in the intended manner.

An advantage of this assembly arrangement would be where there is considerable variation in the thickness of the door edges. While the liner can accommodate significant variations in thickness, such significant variations in thickness may adversely effect the retention characteristics of the metal. For example, a thicker door edge may make it more difficult to apply the metal channel. By applying the liner first and then the metal channel, variations in thickness may be detected more readily because difference in the ease of applicability of the metal channel into its retentive engagement with the liner on the door edge may become more noticeable.

Figure 12:
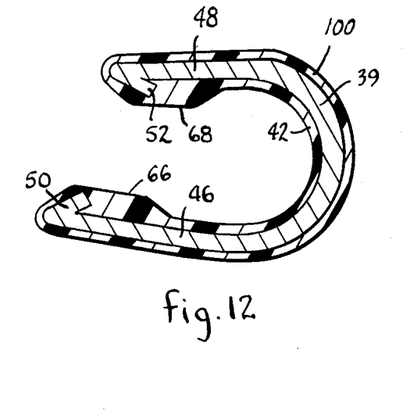
Figure 13:
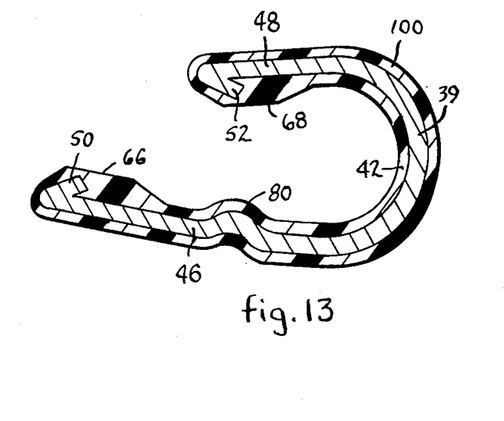
Figure 14:
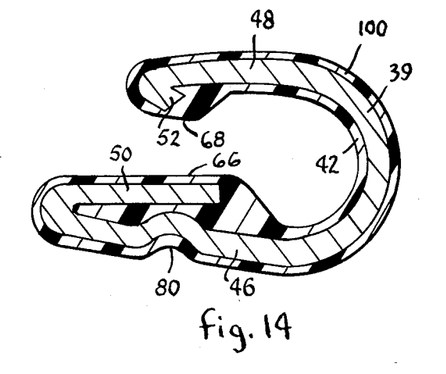
Figure 15:
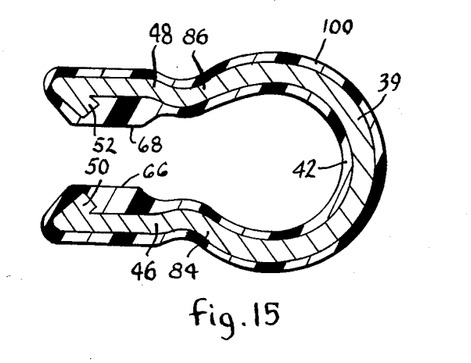
Figure 16:
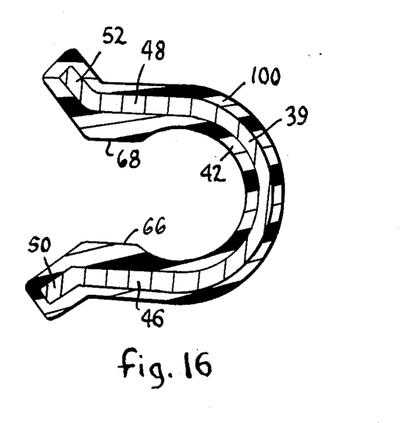
Figure 17:
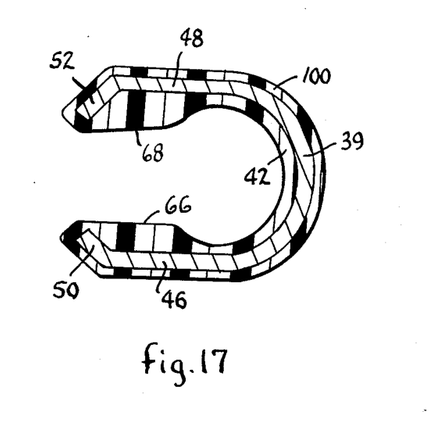
Figure 18:
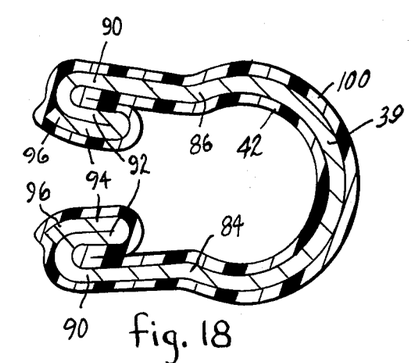
Figure 26:
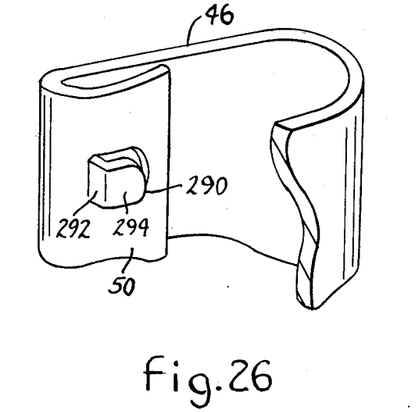
FIG. 26 is a fragmentary perspective view illustrating a portion of a still further embodiment of edge guard embodying principles of the invention.

The embodiment of FIG. 26 comprises a cross section which has the outer leg shorter than the inner leg and in this respect it is similar to FIG. 12. However, unlike FIG. 12 the barb for the inner leg has a greater length in the FIG. 26 embodiment than in the FIG. 12 embodiment.

FIG. 26 illustrates a metal channel by itself before application of the insulation. The barb of the longer inner leg comprises retention tabs 290 which are lanced from the material of the barb at certain desired intervals along its length, and these are disposed directly across from the barb of the opposite leg. It is these tabs which cooperate with the opposite barb in applying the retention force to the door edge when the edge guard is installed thereon. However, insulation fully covers the interior of the metal channel including the barbs and tabs 90, analogous to FIG. 12. In other words, the barbs and tabs are fully encapsulated within insulating material.

The illustrated shape for the tabs 290 comprises a first part 292 and a second part 294. The first part 292 extends from the barb generally toward the barb on the opposite leg. The portion 294 is turned at an angle to portion 92 so as to be more parallel to the door edge.

Figure 26A:
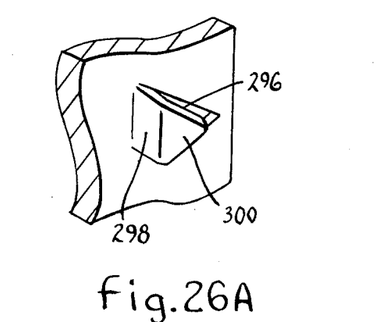
FIG. 26A is a fragmentary view illustrating a modified form of the edge guard of FIG. 26.

FIG. 26A illustrates a modified form for the shape of each tab 290. The tab in FIG. 26A is identified by the reference numeral 296 and it comprises sections 298 and 300 corresponding to the sections 292 and 294 of FIG. 26.

The section 300 of FIG. 26A has a pointed shape rather than the rounded shape of portions 294 of FIG. 26. The embodiment of FIG. 26A is encapsulated with insulation in the same manner as the embodiment of FIG. 26. In other words the tabs and barbs are fully encapsulated by insulating material so that the sharp pointed edges will not dig into the metal of the door.

The advantage of the embodiments of FIG. 26 and FIG. 26A is that installation is accomplished with the tabs readily accommodating the installation by virtue of their interaction with the door edge. However, removal of the edge guard will be resisted by the tabs 290 and 296. Like all embodiments the entire channel may be encapsulated, both inside and/or outside, either wholly or partially by covering the outside with protective insulation. The color of the insulation may be made to match the color of the door or to provide any desired contrast in color.

Figure 27:
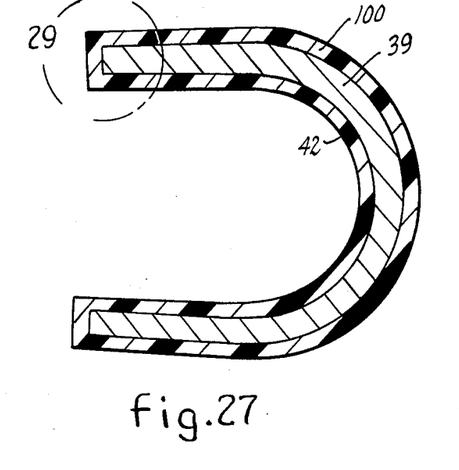
FIG. 27 is a cross sectional view of another embodiment of edge guard.

FIG. 27 illustrates a further embodiment in which the metal channel is a U-shaped cross section having straight parallel legs without barbs or flanges at the distal ends.

The channel is illustrated, in cross section, as being fully encapsulated by co-extruded insulation. In other words, the co-extrusion covers the entire interior and exterior of the metal channel including the distal end surfaces of the legs. Like all embodiments of the invention, the metal channel provides a rigidifying structure and a self-retention characteristic whereby the distal ends of the legs apply the retention force so as to render the edge guard self-retaining. The insulation serves the purpose of protecting against scuffing and possible paint scratching at the points of pressure application both during installation of the edge guard and while the edge guard remains installed. By providing insulation on the exterior, protection is also rendered for external objects which may be struck by the edge guard, and a desired color may be imparted to the edge guard. As mentioned above, the color may match or contrast with that of the door.

If a metallic appearance is desired for the door edge guard it would be possible to omit the insulation from the exterior surface. The insulation could then line just the interior surface, stopping at the distal ends of the legs before the end surfaces. However, this sort of construction would be subject to the possibility of the insulating material being peeled away from the legs during the installation process. Such peeling might occur because the end surfaces of the legs are not covered. Therefore, in order to provide a preferred construction, the insulation should extend over the distal end surfaces of the legs preferably around a part or all of the outside surface of the metal channel.

Figure 29:
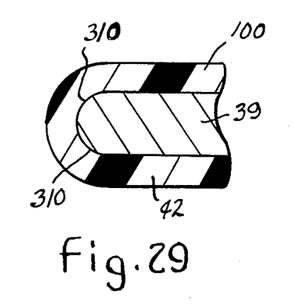
FIG. 29 is an enlarged view in circle 29 of FIG. 27 illustrating a modification.

FIG. 29 is an enlarged view taken in circle 29 of FIG. 27 but illustrating a modified form. Where the metal channel is slit from sheet stock, the end edge surfaces of the metal channel will have sharp corners. FIG. 29 illustrates a construction in which the sharp corners have been eliminated by rounding both side edges of the distal end surface of each leg as indicated at 310.

Figure 28:
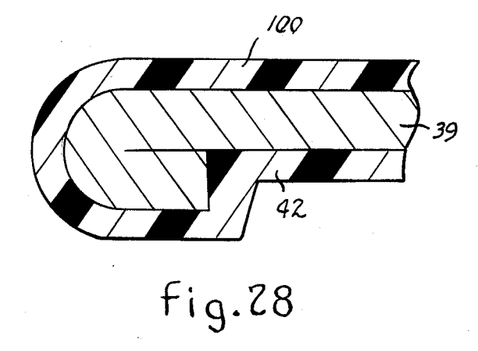
FIG. 28 is a fragmentary cross sectional view illustrating a modified form of edge guard of FIG. 27.

FIG. 28 is a view similar to FIG. 29 and constitutes a modification. In order to provide a rounded distal end it is possible to reverse bend the distal end of each leg fully back onto itself in the manner illustrated. To this rounded end construction, the insulating material is applied so as to cover the metal of the edge guard in the manner shown.

The foregoing has described specific presently preferred embodiments of the invention. Principles of the invention are applicable to other embodiments. Different types of co-extrusion techniques may be employed where the plastic material is co-extruded onto the metal. As noted above, co-extrusion may take place onto the metal in its flat form before roll-forming or onto metal which has been either wholly or partially formed. Roll-forming procedures and extrusion procedures are applicable to the formation of the metal channel itself. While co-extrusion of the insulating film liner onto metal is the preferred practice, it will be appreciated that in certain instances it is possible for principles of the invention to be practiced where the edge guard liner is extruded as a separate piece which is either inserted into the metal channel or onto the door before the metal channel is applied to the door. An example of this is shown by FIG. 25.

Various forms of plastic materials may be used for the insulation. Any suitable material possessing the desired insulated and protective properties either presently known or developed in the future may be used.

Although the edge guards of the present invention are self-retaining, it may be perceived that additional procedures may be used if desired in order to provide additional means of attachment. We refer by way of example to adhesive, chemical, bonding, and other sorts of procedures. With the co-extrusion procedure of the invention, the resultant film may have a graining in which the length of the grain runs along the length of the edge guard. Hence, when the edge guard is being applied to the door, the force which acts on the edge guard is applied cross-wise to the grain of the extruded film making the procedure one in which resistance to tearing is minimized because of the application of the force across the grain of the film, rather than with the grain.

The invention yields improvements in door edge guards and their manufacture which can contribute to improvements in functional performance and manufacturing productivity. The decorative possibilities which may be adopted in the particular practice of the invention yield the potential for many different designs, particularly insofar as color coordination is concerned. Although many of the inventions of applicant which are already the subject of issued and unexpired patents are practiced in the preferred embodiment present invention, the present invention provides still further improvements upon applicant's prior basic insulated edge guards.

What is claimed is:

1. A method of making an insulated metal edge guard comprising providing a one-piece metal channel preformed to a desired cross sectional shape, such as a U, C, J, or V, having a generally semi-circular base from which extend inner and outer legs with distal end portions via which self-retention forces are exerted when the insulated metal edge guard is put to use on an edge, and passing said metal channel through a co-extruding operation to co-extrude insulating material onto the metal channel such that the insulating material covers said distal end portions of said legs, said method including the steps of making a concave crevice in one of said metal channel and said insulating material at one of said distal end portions such that said crevice's concavity is open back toward said base and at an acute angle to the leg containing said one distal end portion, of disposing a projecting portion of the other of said metal channel and said insulating material at said one distal end portion within said crevice, said projecting portion of the other of said metal channel and said insulating material projecting relative to the leg containing said one distal end portion at the same acute angle as the concavity of said crevice, and of forming in said insulating material at said one distal end portion an enlargement on the interior of the leg containing said one distal end portion, said enlargement having a surface substantially parallel to the leg containing said one distal end portion.

2. A method as set forth in claim 1 further including the operation of sizing and cooling the coextruded material after it has been applied to the metal channel.

3. A method as set forth in claim 1 in which the co-extruding operation comprises the steps of first co-extruding insulating material onto one portion of the metal channel and subsequently onto another portion.

4. A method as set forth in claim 1 in which the metal channel is provided with a barb at said one distal end to thereby form said crevice and said insulating material is also co-extruded onto the side and end edges of said barb exterior of said crevice.

5. A method as set forth in claim 4 in which said barb is reverse inwardly turned to form said crevice and said insulating material is co-extruded into said crevice.

6. A method as set forth in claim 4 in which insulating material is co-extruded to cover the entirety of both interior and exterior of the channel cross section.

7. An edge guard made by the method of claim 4.

8. An edge guard made by the method of claim 5.

9. An edge guard made by the method of claim 1.

10. A method as set forth in claim 1 also including the step of making a crevice in said other of said metal channel and said insulating material at said one distal end portion and disposing said one of said metal channel and said insulating material in the latter crevice.

11. An edge guard made by the method of claim 10.

* * * * *